United States Patent
Yoshida et al.

(10) Patent No.: US 12,283,826 B2
(45) Date of Patent: Apr. 22, 2025

(54) POWER RECEIVING DEVICE AND WIRELESS POWER TRANSFER SYSTEM

(71) Applicant: Mitsubishi Electric Corporation, Tokyo (JP)

(72) Inventors: Hidehito Yoshida, Tokyo (JP); Tomokazu Sakashita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/267,100

(22) PCT Filed: Feb. 5, 2021

(86) PCT No.: PCT/JP2021/004378
§ 371 (c)(1),
(2) Date: Jun. 14, 2023

(87) PCT Pub. No.: WO2022/168272
PCT Pub. Date: Aug. 11, 2022

(65) Prior Publication Data
US 2024/0055898 A1 Feb. 15, 2024

(51) Int. Cl.
*H02J 50/12* (2016.01)
*H02J 50/40* (2016.01)
*H02J 50/70* (2016.01)

(52) U.S. Cl.
CPC .............. *H02J 50/12* (2016.02); *H02J 50/40* (2016.02); *H02J 50/70* (2016.02)

(58) Field of Classification Search
CPC ............. H02J 50/12; H02J 50/90; H02J 50/70
See application file for complete search history.

(56) References Cited

U.S. PATENT DOCUMENTS

| 2013/0069440 A1* | 3/2013 | Marukame | H02J 50/12 |
| | | | 307/104 |
| 2014/0184147 A1* | 7/2014 | Uchida | H02J 50/80 |
| | | | 320/162 |

(Continued)

FOREIGN PATENT DOCUMENTS

| CN | 112202251 A | * | 1/2021 |
| JP | 2014-093829 A | | 5/2014 |

(Continued)

OTHER PUBLICATIONS

International Search Report and Written Opinion mailed on Apr. 20, 2021, received for PCT Application PCT/JP2021/004378, filed on Feb. 5, 2021, 8 pages including English Translation.

*Primary Examiner* — Ryan Johnson
(74) *Attorney, Agent, or Firm* — XSENSUS LLP

(57) ABSTRACT

A power receiving device and a wireless power transfer system including the same for non-contact power transfer to a plurality of mobile bodies are obtained, which allow stable power transfer even when the number of power transfer targets varies. In the wireless power transfer system, electric power is transmitted from a power transmitting source in a power transmitting device to generate a high frequency voltage and a power-transmitting resonant circuit with a power transmitting coil to generate an AC magnetic flux by resonance when receiving the high frequency voltage. A power-receiving resonant circuit receives the AC magnetic flux transmitted from the power-transmitting resonant circuit and converts the AC magnetic flux into AC power. At least one compensation element cancels out a variation of an inductance of the power transmitting coil attributable to the movement of the power-receiving resonant circuit to a position where electric power can be received.

6 Claims, 14 Drawing Sheets

(56) References Cited

U.S. PATENT DOCUMENTS

| | | | |
|---|---|---|---|
| 2021/0044151 A1* | 2/2021 | Nakao | H02J 50/80 |
| 2022/0140655 A1* | 5/2022 | Nakao | H02J 50/12 |
| | | | 320/108 |

FOREIGN PATENT DOCUMENTS

| | | |
|---|---|---|
| JP | 5927583 B2 | 6/2016 |
| JP | 2018-117404 A | 7/2018 |
| JP | 2020-137180 A | 8/2020 |

* cited by examiner

POWER RECEIVING DEVICE AND WIRELESS POWER TRANSFER SYSTEM

CROSS-REFERENCE TO RELATED APPLICATION

The present application is based on PCT filing PCT/JP2021/004378, filed Feb. 5, 2021, the entire contents of which are incorporated herein by reference.

TECHNICAL FIELD

The present disclosure relates to a power receiving device for a wireless power transfer system that performs non-contact power transmission and power reception and a wireless power transfer system including the power receiving device.

BACKGROUND ART

Wireless power transfer technology that performs non-contact electric power transmission through magnetic field coupling between two coils separated by space has been known for some time. As one of the configurations of this technology, there exists a wireless power transfer system that performs power transfer from a single power transmitting coil to a plurality of power receiving coils. In such a configuration, the power transmitting coil needs to magnetically couple with a number of power receiving coils. Therefore, in general, the power transmitting coil is larger in size than each power receiving coil. In addition, many of the targeted applications of such a configuration are those for transferring electric power to mobile bodies. In those applications, a system to transfer electric power to the power receiving coils provided to the mobile bodies moving along the power transmitting coil is assumed. Therefore, in a case where the area in which the power transmitting coil is provided covers only part of the moving area of the power receiving coils, the number of the power receiving coils that can receive electric power from the power transmitting coil varies from time to time. The variation in the number of the power receiving coils facing the power transmitting coil causes variation in circuit constants and thus in circuit operation, which leads to problems such as inappropriate power transfer and inefficiency due to increase of reactive power.

In response to the above, a transmission unit of the wireless power transfer device, for example, according to Patent Document 1 is provided with two or more capacitor circuit groups to achieve the desired circuit operation by switching the circuit connection to a predetermined capacitor circuit group in accordance with the number of the mobile bodies being the power transfer targets. Also, in Patent Document 2, a non-contact power transfer system includes a circuit with a capacitor and a switching element on the power transmitting side of the system to achieve a desired circuit operation by controlling the circuit and thus controlling a capacitive reactance component.

PRIOR ART DOCUMENTS

Patent Documents

[Patent Document 1] Japanese Unexamined Patent Application Publication No. 2018-117404
[Patent Document 2] Japanese Unexamined Patent Application Publication No. 2014-93829

SUMMARY OF THE INVENTION

Problems to be Solved by the Invention

However, the configuration having a circuit with a capacitor on the power transmitting side of the wireless power transfer system to adjust the electric power to a necessary capacity depending on the number of the mobile bodies which need power transfer requires the detection of the load conditions on the power receiving side and the control on the power transmitting side, as a conventional system does. In addition to complicating the system, this creates a problem of output variation due to the delay between the detection of the load variation and the control.

The present disclosure is devised to solve the above-mentioned problems and to provide, in a wireless power transfer system that performs non-contact power transfer for a plurality of mobile bodies, a power receiving device that enables stable power transfer even if the number of power transfer targets varies and a wireless power transfer system including the power receiving device.

Means for Solving Problems

A power receiving device for a wireless power transfer system, according to the present disclosure, is a power receiving device to which electric power is transmitted from a power transmitting device that includes a power transmitting source to generate a high frequency voltage and a power-transmitting resonant circuit with a power transmitting coil to generate an AC magnetic flux by resonance when receiving the high frequency voltage. The power receiving device includes a power-receiving resonant circuit to receive the AC magnetic flux transmitted from the power-transmitting resonant circuit and convert the AC magnetic flux into AC power; a rectifier circuit to convert the AC power outputted from the power-receiving resonant circuit into DC power; a filter to attenuate a high frequency component included in the output from the rectifier circuit; and at least one compensation element provided to cancel out a variation of an inductance of the power transmitting coil, the variation attributable to the move of the power-receiving resonant circuit to a position where electric power can be received.

A wireless power transfer system according to the present disclosure including a power transmitting device and a plurality of power receiving devices, the power transmitting device including a power transmitting source to generate a high frequency voltage and a power-transmitting resonant circuit with a power transmitting coil to generate an AC magnetic flux by resonance when receiving the high frequency voltage, the power receiving devices each including: a power-receiving resonant circuit to receive the AC magnetic flux transmitted from the power-transmitting resonant circuit and convert the AC magnetic flux into AC power; a rectifier circuit to convert the AC power outputted from the power-receiving resonant circuit into DC power; a filter to attenuate a high frequency component included in the output from the rectifier circuit; and at least one compensation element provided to cancel out a variation of an inductance of the power transmitting coil, the variation attributable to the move of the power-receiving resonant circuit to a position where electric power can be received.

Effects of the Invention

The power receiving device according to the present disclosure includes a compensation element provided to offset a variation in the inductance of the power transmitting coil, the variation being attributable to the move of a power-receiving resonant circuit to the position at which power can be received. This allows the power transfer to be stable regardless of the variation in the number of power transfer targets in the wireless power transfer system.

The wireless power transfer system according to the present disclosure includes the power receiving device with a compensation element provided to offset a variation in the inductance of the power transmitting coil, the variation being attributable to the move of a power-receiving resonant circuit to the position at which power can be received. This allows the power transfer to be stable regardless of the variation in the number of the power transfer targets in the wireless power transfer system.

EMBODIMENTS FOR CARRYING OUT THE INVENTION

In the following, examples of the power receiving device of the wireless power transfer system will be described with reference to the drawings. The configurations are not limited unless they go beyond their gist. Note that through the embodiments, the identical or similar components are marked with the same symbol.

Embodiment 1

Figure 1:
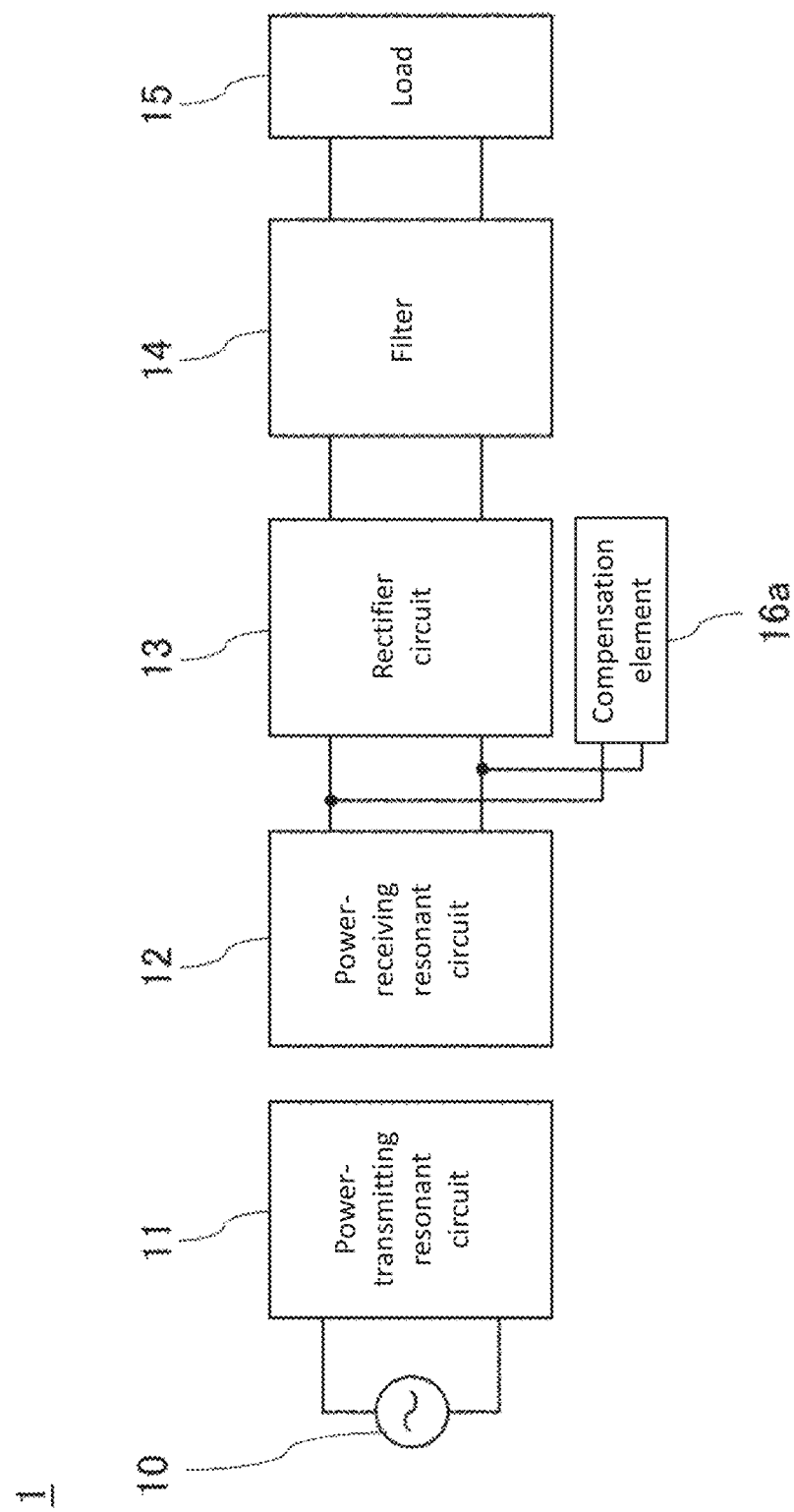
FIG. 1 is a diagram showing a schematic configuration of a wireless power transfer system according to Embodiment 1 of the present disclosure.

FIG. 1 is a diagram showing a schematic configuration of a wireless power transfer system according to Embodiment 1 of the present disclosure. As shown in FIG. 1, the wireless power transfer system 1 includes, for example, a power transmitting source 10, a power-transmitting resonant circuit 11, a power-receiving resonant circuit 12, a rectifier circuit 13, a filter 14, a load 15, and a compensation element 16a. In the wireless power transfer system 1, the electric power supplied from the power transmitting source 10 is transmitted in a non-contact manner from the power-transmitting resonant circuit 11 to the power-receiving resonant circuit 12. The rectifier circuit 13 converts AC power received by the power-receiving resonant circuit 12 to DC power. The filter 14 attenuates the AC component included in the output electric power from the rectifier circuit 13, and the load 15 consumes or stores the electric power. The compensation element 16a is connected in parallel between the power-receiving resonant circuit 12 and the rectifier circuit 13 to make the resonant conditions of the power-transmitting resonant circuit 11 constant.

The power transmitting source 10 is a power supply that outputs a high frequency current or a frequency current voltage. The power transmitting source 10 may include a power converter such as an inverter and a DC/DC converter, and its output waveform may be a waveform including multiple frequency components, such as a square waveform.

Figure 2:
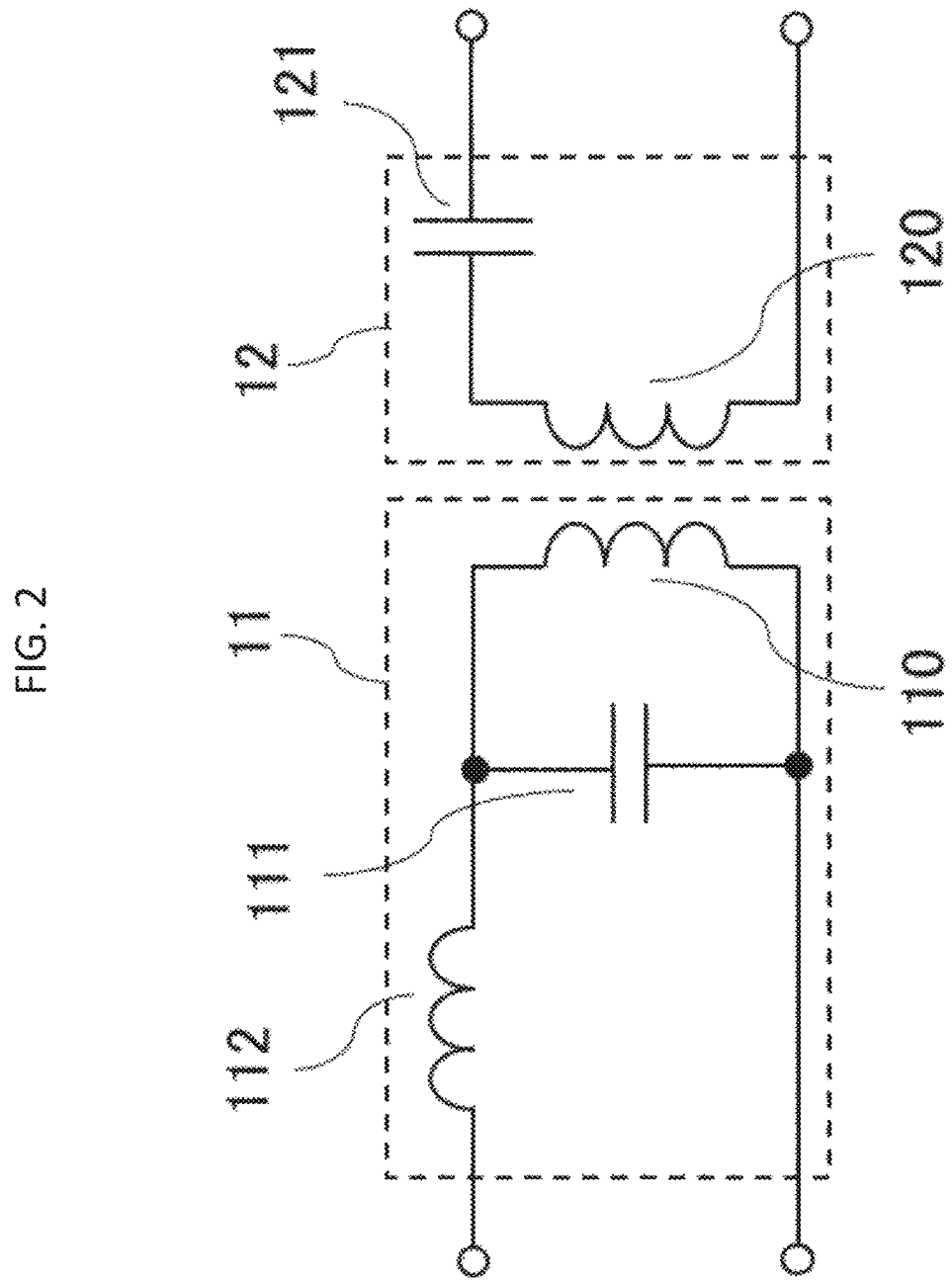
FIG. 2 is a schematic configuration diagram showing an example of a power-transmitting resonant circuit and a power-receiving resonant circuit according to Embodiment 1 of the present disclosure.

FIG. 2 is a schematic configuration diagram showing an example of the power-transmitting resonant circuit and the power-receiving resonant circuit according to Embodiment 1 of the present disclosure. As shown in FIG. 2, the power-transmitting resonant circuit 11 includes a power transmitting coil 110 and at least one power-transmitting-side resonant capacitor 111. The power-transmitting resonant circuit 11 may further include a resonant reactor 112 besides the power transmitting coil 110. The power transmitting coil 110 and the power-transmitting-side resonant capacitor 111 are designed to satisfy the resonant conditions at the output frequency of the power transmitting source 10. In a case where the output waveform of the power transmitting source 10 is a waveform including a harmonic component, such as a square waveform, the circuit design is carried out, generally, such that the power-transmitting resonant circuit 11 satisfies the resonant conditions for the fundamental component of the output waveform, but alternatively may be carried out such that the power-transmitting resonant circuit 11 resonates for the harmonic component of the output waveform. The path of a resonant current flowing in the power-transmitting resonant circuit 11 is the same while the wireless power transfer system 1 is operating. Note here that the power-transmitting resonant circuit 11 shown in FIG. 2 represents one of the various resonant circuit configurations and does not limit the configuration of the power-transmitting resonant circuit 11.

As shown in FIG. 2, the power-receiving resonant circuit 12 includes a power receiving coil 120 and at least one power-receiving-side resonant capacitor 121. The power-receiving resonant circuit 12 may further include a resonant reactor besides the power receiving coil 120. The power receiving coil 120 and the power-receiving-side resonant capacitor 121 are designed to satisfy the resonant conditions at the output frequency of the power transmitting source 10. The power transmitting coil 110 and the power-transmitting-side resonant capacitor 111 are designed to satisfy the resonant conditions at the output frequency of the power transmitting source 10. In a case where the output waveform of the power transmitting source 10 is a waveform including a harmonic component, such as a square waveform, the circuit design is carried out, generally, such that the power-receiving resonant circuit 12 satisfies the resonant conditions for the fundamental component of the output waveform, but alternatively may be carried out such that the power-receiving resonant circuit 12 resonates for the harmonic component of the output waveform. Here, the power-receiving resonant circuit 12 shown in FIG. 2 includes the power receiving coil 120 and one resonant capacitor 121 connected in series thereto, but this configuration represents an example of various resonant circuit configurations and does not limit the configuration of the resonance circuits.

Figure 3:
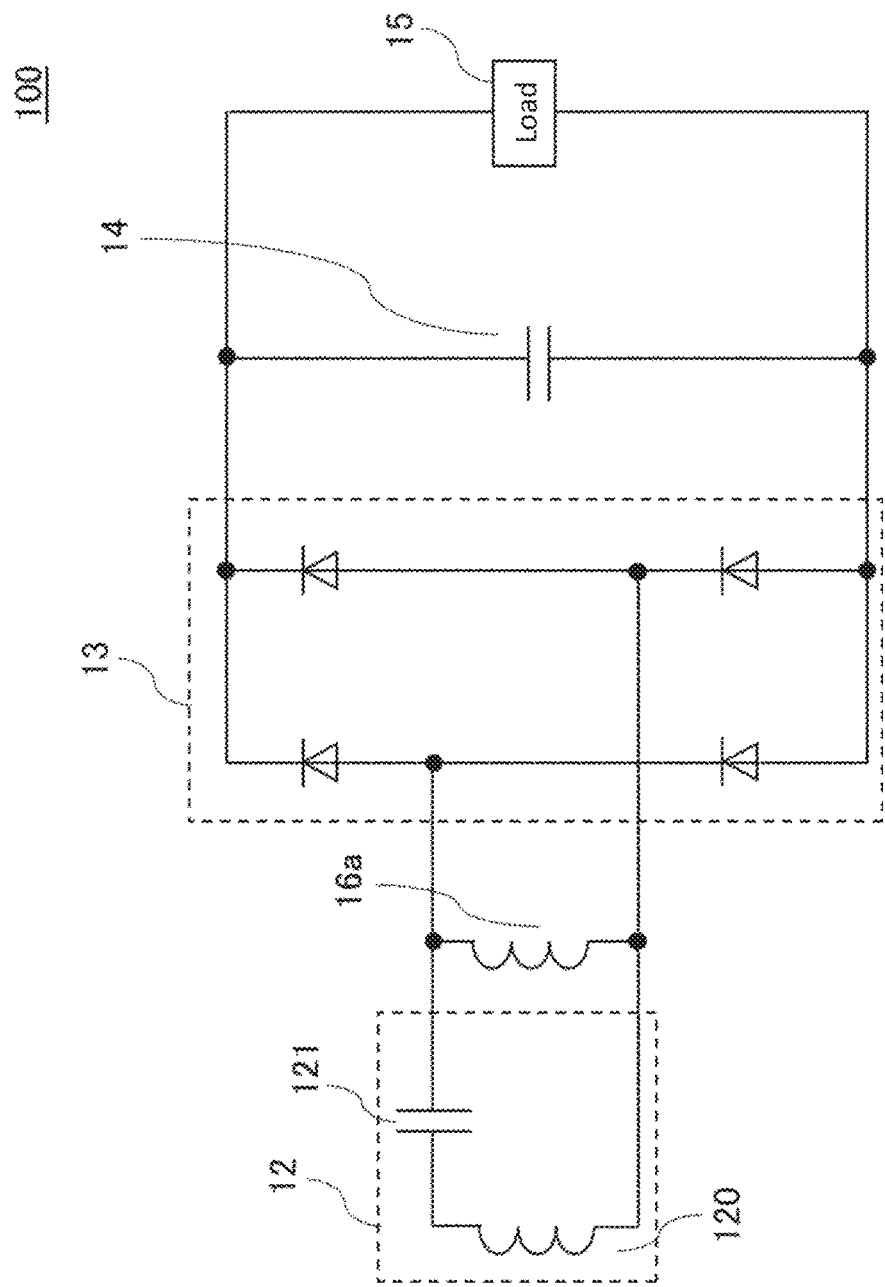
FIG. 3 is a schematic configuration diagram showing a circuit configuration of a power receiving device according to Embodiment 1 of the present disclosure.

FIG. 3 is a schematic configuration diagram showing a circuit configuration of the power receiving device according to Embodiment 1 of the present disclosure. As shown in FIG. 3, a power receiving device 100 includes the power-receiving resonant circuit 12, the rectifier circuit 13, the filter 14, the load 15, and the compensation element 16a. The rectifier circuit 13 includes a configuration, for example, in which four diode elements are connected in a full bridge, and receives AC power outputted from the power-receiving resonant circuit 12 to output DC power. The filter 14 is, for example, a C filter composed of a capacitor to attenuate high frequency components included in the voltage and the current outputted from the rectifier circuit 13. The filter 14 may have a different filter configuration such as that of an LC filter composed of a capacitor and a reactor, depending on the system configuration. The load 15 is, for example, a motor that consumes electric power or a battery that stores electric power. The configuration of the load may include a power converter to regulate the load voltage.

The compensation element 16a is, for example, a reactor connected in parallel between the power-receiving resonant circuit 12 and the rectifier circuit 13 to compensate the amount of the inductance increase in the power transmitting coil 110. FIG. 2 shows an example with a reactor connected as the compensation element 16a, but this does not mean to limit a reactance element. Alternatively, a capacitor connected as the compensation element 16a may compensate the amount of the inductance decrease in the power transmitting coil 110.

Figure 4:
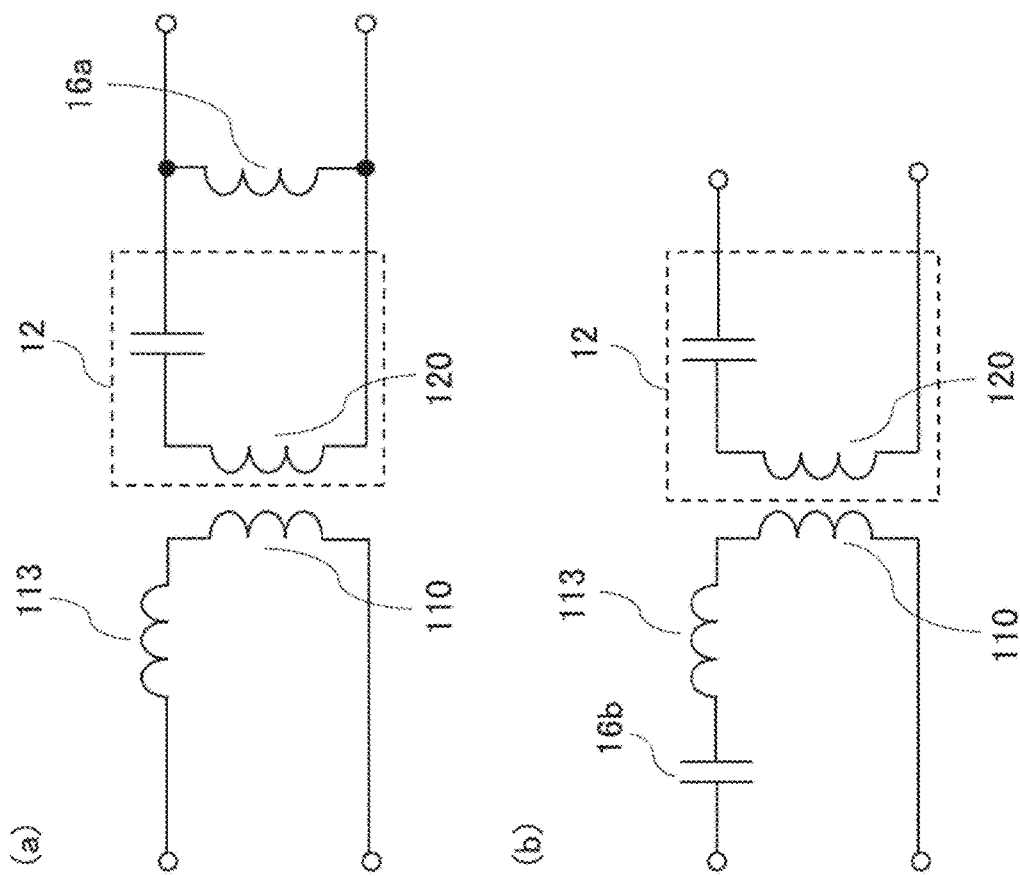
FIG. 4 is a schematic configuration diagram showing an example of an equivalent circuit of a resonant circuit portion including a compensation element of the power receiving device according to Embodiment 1 of the present disclosure.

FIG. 4 is a schematic configuration diagram showing an example of an equivalent circuit of a resonant circuit portion including a compensation element of the power receiving device according to Embodiment 1 of the present disclosure. In FIG. 4, an increased inductor 113 represents an inductance increased due to the influence of the power receiving coil 120 when the power transmitting coil 110 and the power receiving coil 120 take their respective positions that allow power transfer from the former to the latter. The increased inductor 113 is not a concrete component intentionally connected to the circuit, but a representation of a reactance component that occurs when the power transmitting coil 110 and the power receiving coil 120 are in physical proximity and then in magnetic coupling. Meanwhile, since the capacity of the resonant capacitor (not shown) included in the power-transmitting resonant circuit 11 does not vary, the resonant frequency of the power-transmitting resonant circuit 11 would vary in the absence of the influence of the compensation element 16a.

FIG. 4(b) shows an equivalent circuit of the circuit shown in FIG. 4(a), wherein the compensation element 16a in FIG. 4(a) can be considered as a capacitive reactance 16b equivalently connected in series to the power transmitting coil 110. The compensation element 16a in FIG. 4(a) is designed such that the combined impedance of the capacitive reactance 16b and the increased inductor 113 in FIG. 4(b) is zero at the resonant frequency. By designing it as such, the influence of the increased inductor 113 can be eliminated and the variation in the resonant frequency can be suppressed. In FIG. 4(b), the increased inductor 113 and the capacitive reactance 16b both appear in a state in which the power receiving coil 120 and the power transmitting coil 110 are magnetically coupled. Therefore, when the power receiving coil 120 is at a position where it is out of the magnetic coupling and thus cannot receive electric power, the power transmitting coil 110 shows its predetermined design value since there is no influence of the increased inductor 113 and the capacitive reactance 16b.

As described above, in a state where the power transfer is possible, the increased inductor 113 and the compensation element 16b cancel each other out, and in a state where the power transfer is impossible, the influences of the increased inductor 113 and the compensation element 16b both disappear. As a result, in either state, only the inductance of the power transmitting coil 110 is effective, so that the variation of the resonant conditions of the power-transmitting resonant circuit 11 can be suppressed.

Figure 5:
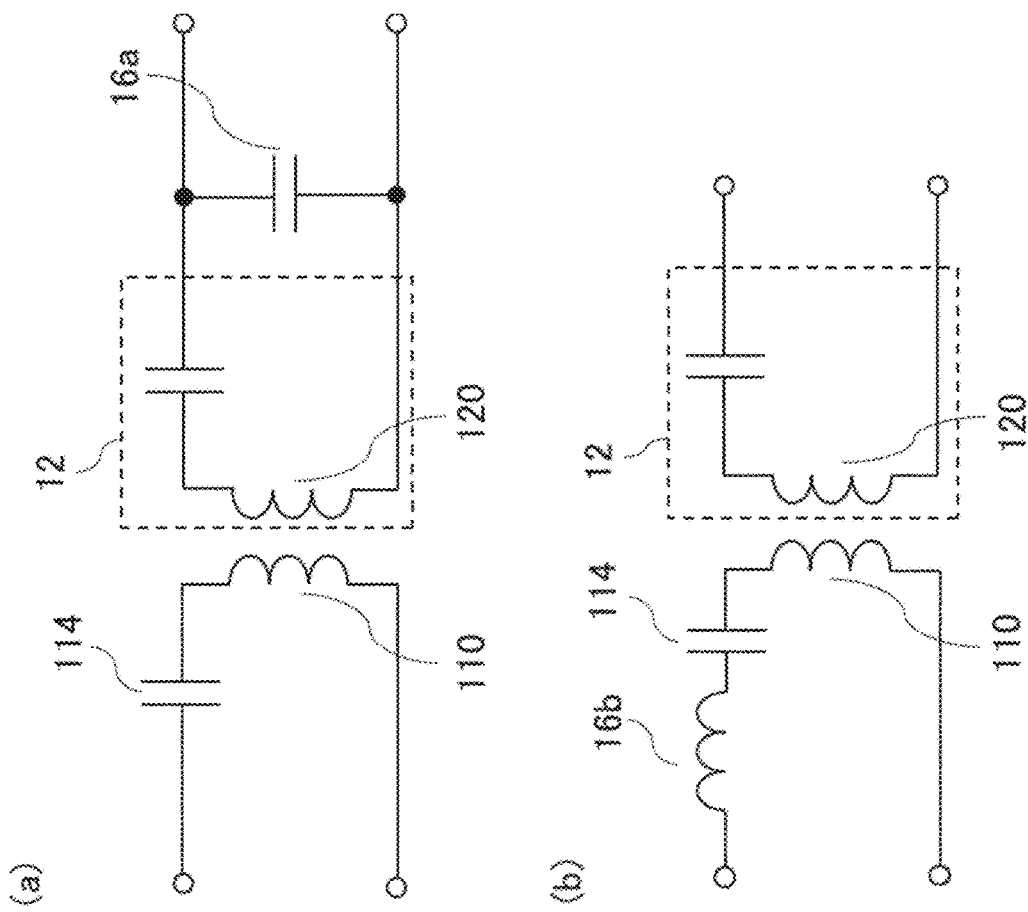
FIG. 5 is a schematic configuration diagram showing another example of the equivalent circuit of the resonant circuit portion including the compensation element according to Embodiment 1 of the present disclosure.

FIG. 5 is a schematic configuration diagram showing an example of an equivalent circuit of a resonant circuit portion including a compensation element of the power receiving device according to Embodiment 1 of the present disclosure. In FIG. 5, an additional capacitor 114 represents an inductance decreased due to the influence of the power receiving coil 120 when the power transmitting coil 110 and the power receiving coil 120 take their respective positions that allow power transfer from the former to the latter. The additional capacitor 114 is not a concrete component intentionally connected to the circuit, but a representation of a reactance component that occurs when the power transmitting coil 110 and the power receiving coil 120 are in physical proximity. Meanwhile, since the capacity of the resonant capacitor (not shown) included in the power-transmitting resonant circuit 11 does not vary, the resonant frequency of the power-transmitting resonant circuit 11 would vary in the absence of the influence of the compensation element 16a.

FIG. 5(b) shows an equivalent circuit of the circuit shown in FIG. 5(a), wherein the compensation element 16a in FIG. 5(a) can be considered as an inductive reactance 16b equivalently connected in series to the power transmitting coil 110. The compensation element 16a in FIG. 5(a) is designed such that the combined impedance of the inductive reactance 16b and the additional capacitor 114 in FIG. 5(b) is zero at the resonant frequency. By designing it as such, the influence of the additional capacitor 114 can be eliminated and the variation in the resonant frequency can be suppressed. In FIG. 5(b), the additional capacitor 114 and the inductive reactance 16b both appear in a state in which the power receiving coil 120 and the power transmitting coil 110 are in physical proximity. Therefore, when the power receiving coil 120 is at a position where it is out of physical proximity and thus cannot receive electric power, the power transmitting coil 110 shows its predetermined design value since there is no influence of the additional capacitor 114 and the inductive reactance 16b.

As described above, in a state where the power transfer is possible, the additional capacitor 114 and the compensation element 16b cancel each other out, and in a state where the power transfer is impossible, the influences of the additional capacitor 114 and the compensation element 16b both disappear. As a result, in either state, only the inductance of the power transmitting coil 110 is effective, so that the variation of the resonant conditions of the power-transmitting resonant circuit 11 can be suppressed.

Although description will be given, hereinafter, only for the cases in which it is assumed that the increased inductor 113 is connected in series to the power transmitting coil 110 when the power transmitting coil 110 and the power receiving coil 120 come into proximity, this does not limit the scope of the effect of the present invention because it is possible, as mentioned above, to obtain the effect of the present invention even when the additional capacitor 114 is connected to the power transmitting coil 110.

Figure 6:
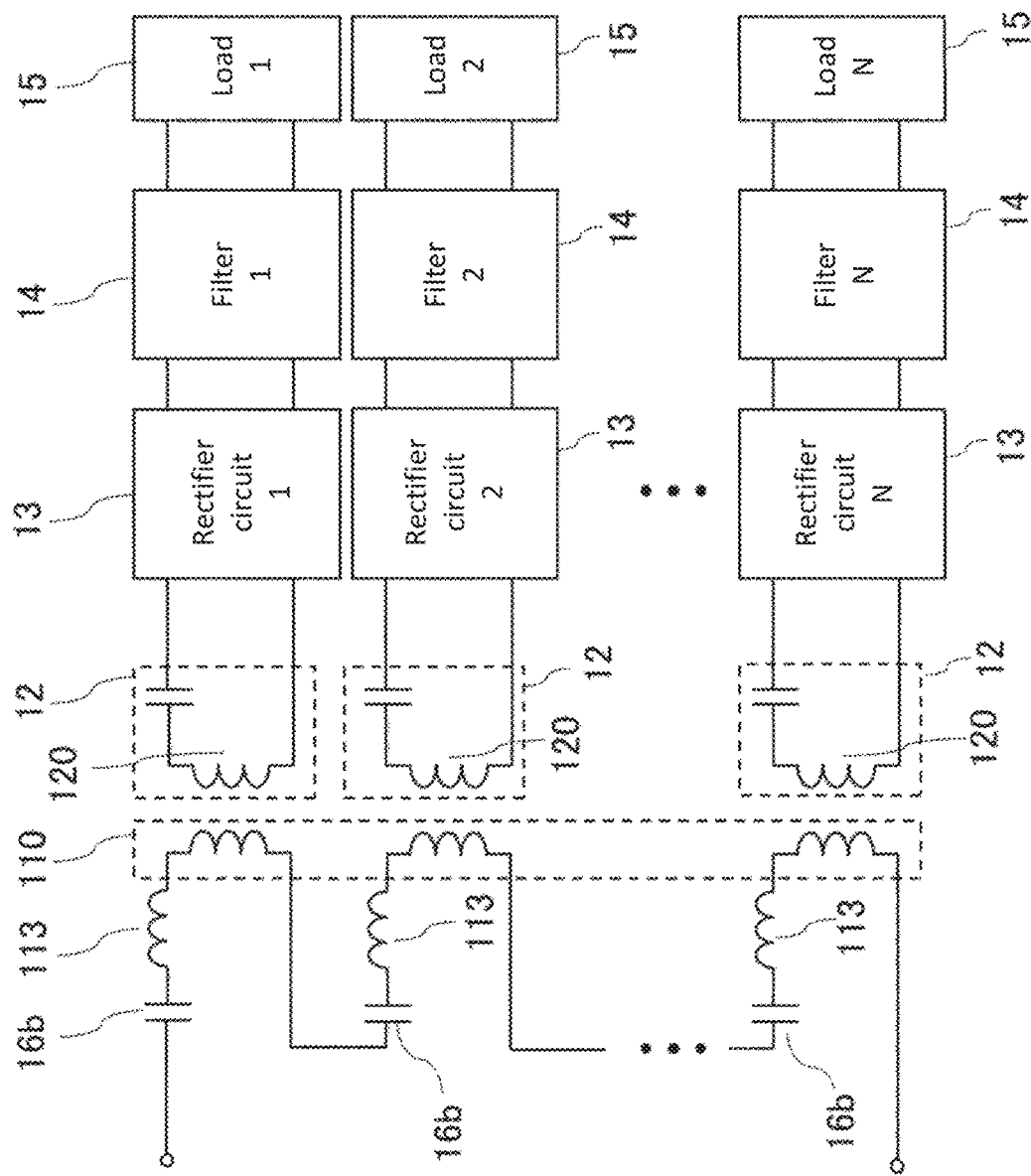
FIG. 6 is a schematic configuration diagram of the wireless power transfer system with a plurality of power receiving devices according to Embodiment 1 of the present disclosure.

FIG. 6 is a schematic configuration diagram of the wireless power transfer system with a plurality of power receiving devices according to Embodiment 1 of the present disclosure. Components with the same functionality as in FIG. 1 are marked with the same symbol. As shown in FIG. 6, when assuming that N power receiving devices 100 are provided, the configuration with N power receiving coils 120 located at the power transmitting coil 110 is equivalent to the configuration of a circuit with N increased inductors 113 connected to the power transmitting coil 110. Let the inductance of each increased inductor 113 be ΔL1, then the total variation in inductance of the power transmitting coil 110 due to the influence of the power receiving coils 120 is expressed as N×ΔL1.

Meanwhile, in the power receiving device 100 according to the present disclosure, each compensation element 16b is connected equivalently in series to the power transmitting coil 110, so that the number of the connections is N, which is equal to the number of the power receiving devices 100. Each compensation element 16b is designed to cancel out with ΔL1 at the resonant frequency, and thus the increase of inductance of the power transmitting coil 110, which is N×ΔL1, cancels out with the N compensation elements 16b. Thus, even when the number of the power receiving devices 100 increases, the increase in inductance of the power transmitting coil 110 can be controlled, so that the resonant conditions of the power-transmitting resonant circuit 11 can be satisfied.

Each of the increased inductors 113 is something like a power-transmitting-side resonant capacitor, and the capacity of the power-transmitting-side resonant capacitor is constant regardless of the number of the power receiving devices 100 present at the positions to receive electric power because the increase of inductance of the power transmitting coil is suppressed. Here, "constant" means "approximately constant" and is assumed to include some errors.

As described above, according to the power receiving device 100 of the present disclosure, the compensation elements 16a, connected in parallel between the power-receiving resonant circuits 12 and the rectifier circuits 13, cancel out, when electric power is being fed, the reactance component of the increased inductors 113 or the additional capacitors 114 which are equivalently connected on the power transmitting side, so that the resonant conditions of the power-transmitting resonant circuit 11 can be satisfied regardless of the number of the power receiving devices to which electric power is to be fed. In this configuration, the compensation elements 16a function in accordance with the number of the power receiving device 100, so that there is no need for means for detecting the number of the power receiving devices 100 and thus for means for controlling switches on the power transmitting side in accordance with the detection results. This prevents the system from being complicated and eliminates the need for voltage/current sensors to detect the number of the power receiving devices 100 and control components such as switches.

Embodiment 2

Figure 7:
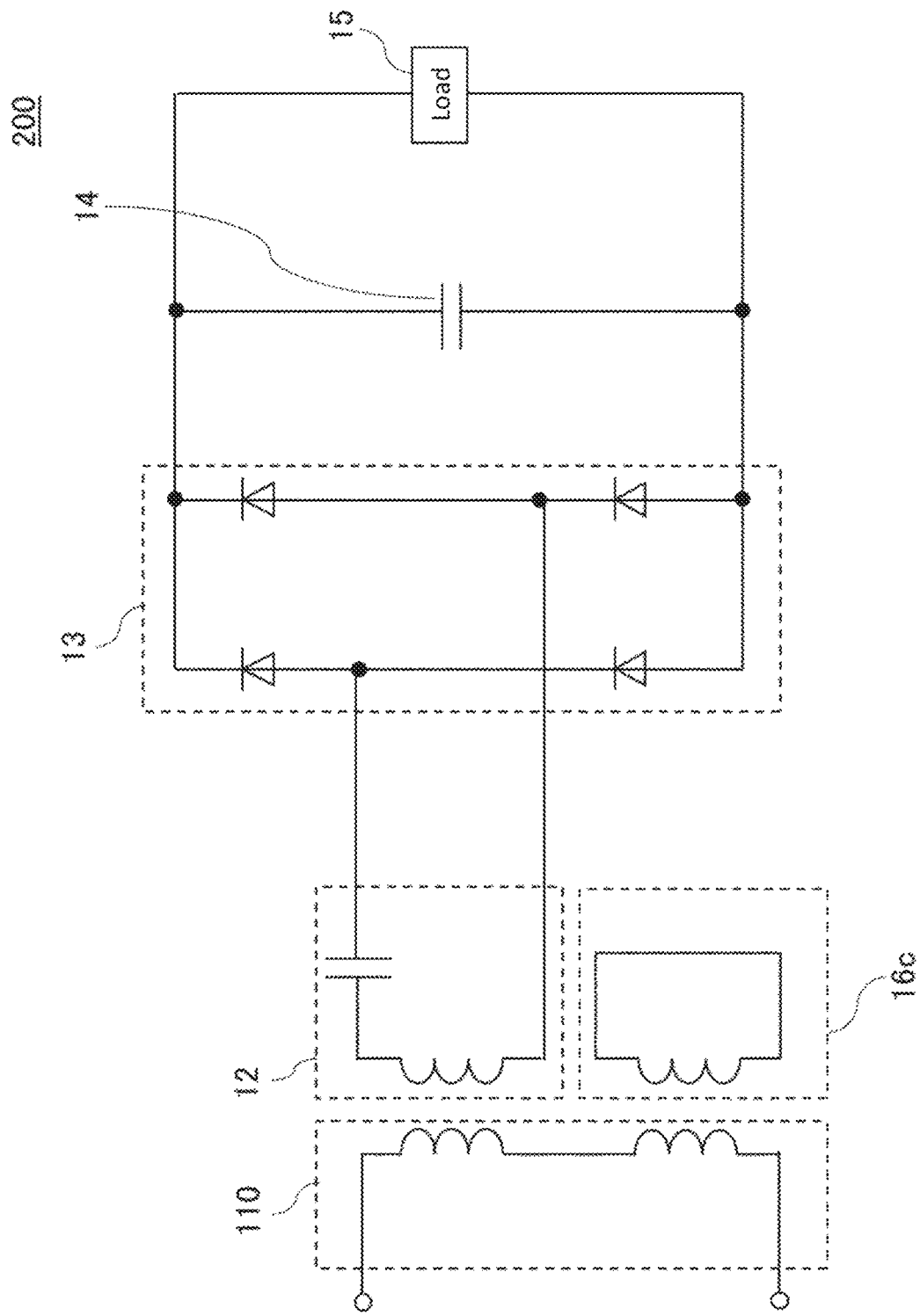
FIG. 7 is a schematic configuration diagram showing a circuit configuration of a power receiving device according to Embodiment 2 of the present disclosure.

FIG. 7 is a schematic configuration diagram showing a circuit configuration of a power receiving device according to Embodiment 2 of the present disclosure. Although both ends of a compensation element 16c shown in FIG. 7 are shorted, the impedance may be adjusted by connecting a reactance element such as a reactor or a capacitor. In the power receiving device 200 according to Embodiment 2, the compensation element 16c is connected to the circuit as a reactor magnetically coupled with the power transmitting coil 110. The power receiving device 200 according to Embodiment 2 also is applied to the wireless power transfer system shown in Embodiment 1. The following description will focus on points that differ from Embodiment 1, and similar points will be omitted as appropriate. The same or equivalent portions as those in FIG. 3 are marked with the same symbol and their description will be omitted.

Figure 8:
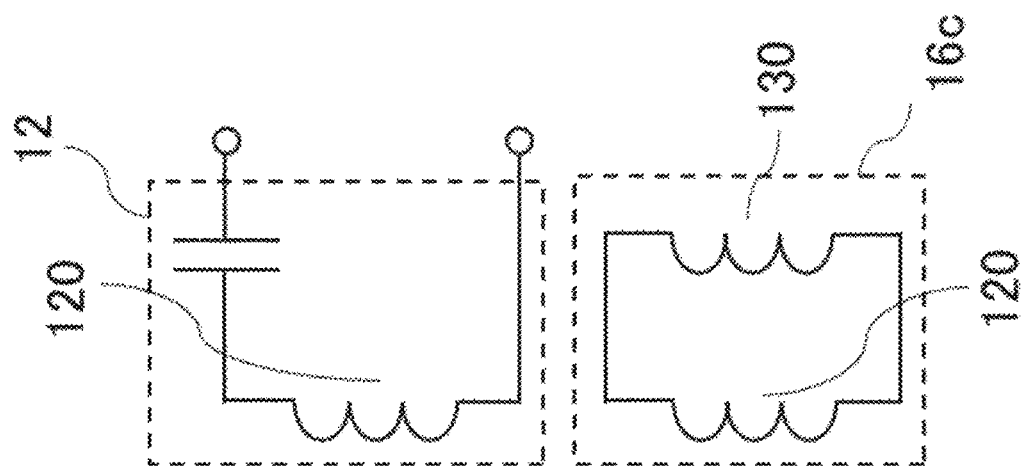
FIG. 8 is a schematic configuration diagram showing an example of the circuit configuration of the power receiving device according to Embodiment 2 of the present disclosure.

FIG. 8 is a schematic configuration diagram showing an example of the circuit configuration of the power receiving device according to Embodiment 2 of the present disclosure. If the inductance of the power transmitting coil 110 is expected to increase due to the influence of the power receiving coil 120, then in the power receiving device 200, it is possible to make the compensation element 16c function as an inductive reactance component by connecting a reactance 130, as shown in FIG. 8.

Figure 9:
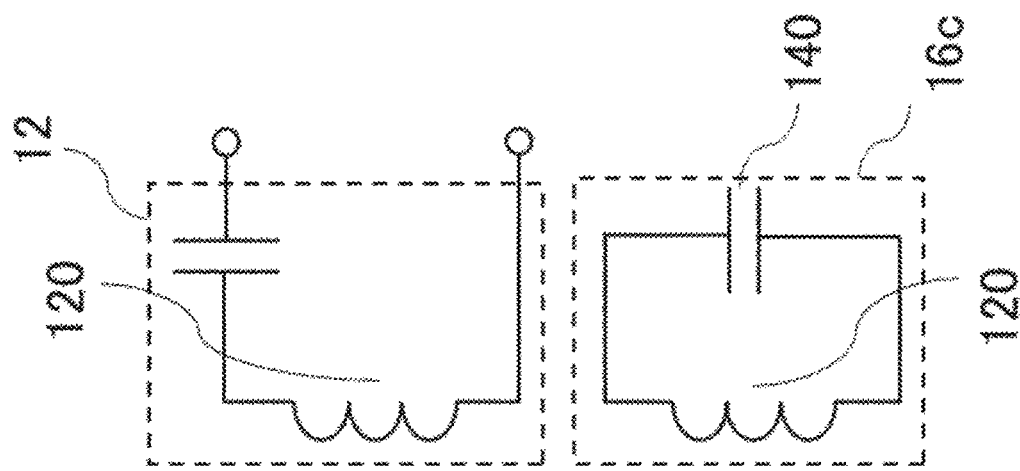
FIG. 9 is a schematic configuration diagram showing another example of the circuit configuration of the power receiving device according to Embodiment 2 of the present disclosure.

FIG. 9 is a schematic configuration diagram showing another example of the circuit configuration of the power receiving device according to Embodiment 2 of the present disclosure. If the inductance of the power transmitting coil 110 is expected to decrease due to the influence of the power receiving coil 120, then it is possible to make the compensation element 16c function as a capacitive reactance component by connecting a capacitor 140, as shown in FIG. 9.

Figure 10:
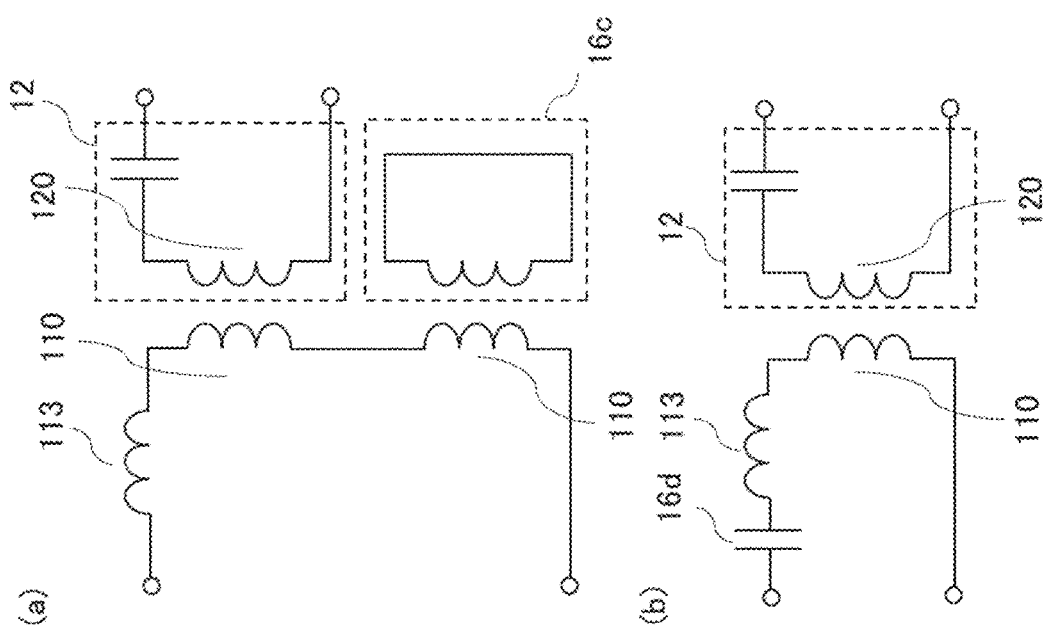
FIG. 10 is a schematic configuration diagram showing an equivalent circuit of a resonant circuit portion including a compensation element of the power receiving device according to Embodiment 2 of the present disclosure.

FIG. 10 is a schematic configuration diagram showing an equivalent circuit of a resonant circuit portion including a compensation element of the power receiving device according to Embodiment 2 of the present disclosure. In the power receiving circuit according to Embodiment 2 shown in FIG. 10, the increased inductor 113 is compensated by using a leakage inductance component of the compensation element 16c. Therefore, the coupling coefficient between the power transmitting coil 110 and the compensation element 16c needs to be less than 1.

When the compensation element 16c has a leakage inductance, the circuit configuration is a configuration with the leakage inductance connected in parallel to the power-receiving resonant circuit 12. FIG. 10(b) shows an equivalent circuit in which the compensation element 16c is replaced with a reactance component on the side of the power-transmitting resonant circuit 11, wherein a capacitive reactance 16d is shown connected in series to the power transmitting coil 110. This produces an effect to lower the inductance of the power transmitting coil 110, such as that exerted in the power receiving device 100 according to Embodiment 1. Therefore, by designing the compensation element 16c such that the increased inductor 113 and the capacitive reactance 16d cancel each other out, an effect similar to that obtained in Embodiment 1 can be obtained.

Also, in the power receiving device 200 according to the present embodiment, the compensation element 16c is connected to the circuit as a reactor magnetically coupled with the power transmitting coil 110. In Embodiment 1, the compensation current flows through the power receiving coil 120, the compensation element 16a, and the resonant capacitor 121 because the flow is via the power-receiving resonant circuit 12 and the compensation element 16a. In contrast, in the configuration of Embodiment 2, the compensation current only flows through the compensation element 16c, so that the loss due to the flow of the compensation current can be suppressed.

Embodiment 3

Figure 11:
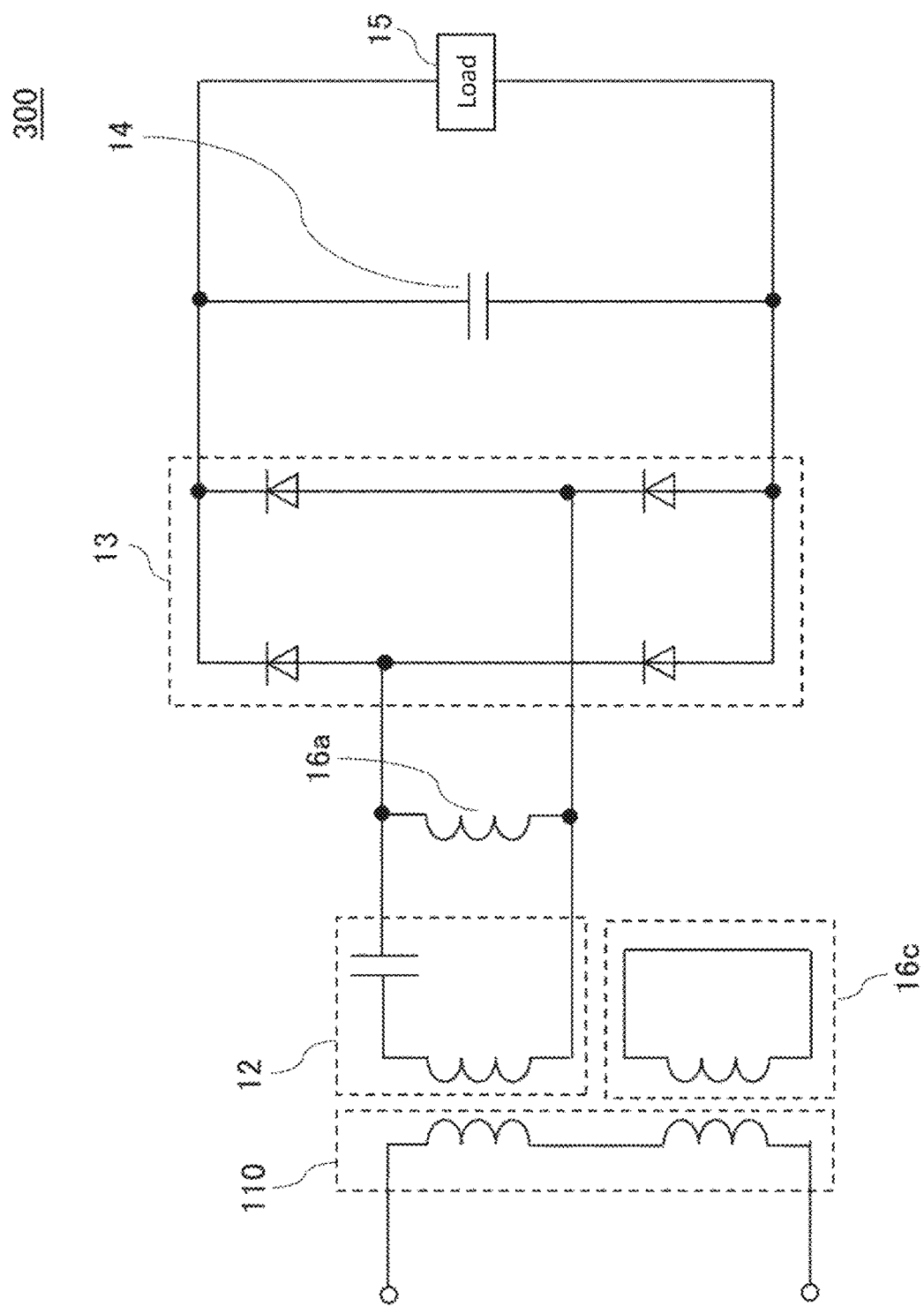
FIG. 11 is a schematic configuration diagram showing a circuit configuration of a power receiving device according to Embodiment 3 of the present disclosure.

FIG. 11 is a schematic configuration diagram showing a circuit configuration of a power receiving device according to Embodiment 3 of the present disclosure. A power receiving device 300 according to Embodiment 3 has a configuration including a plurality of compensation elements, wherein a first compensation element 16a is connected in parallel between the power-receiving resonant circuit 12 and the rectifier circuit 13, and a second compensation element 16c is connected to the circuit as a reactor magnetically coupled with the power transmitting coil. The power receiving device 300 according to Embodiment 3 also is applied to the wireless power transfer system shown in Embodiment 1. The following description will focus on points that differ from Embodiment 1, and similar points will be omitted as appropriate. The same or equivalent portions as those in FIG. 3 are marked with the same symbol and their description will be omitted.

Although both ends of the second compensation element 16c shown in FIG. 11 are shorted, the impedance may be adjusted by connecting a reactance element such as a reactor or a capacitor.

Figure 12:
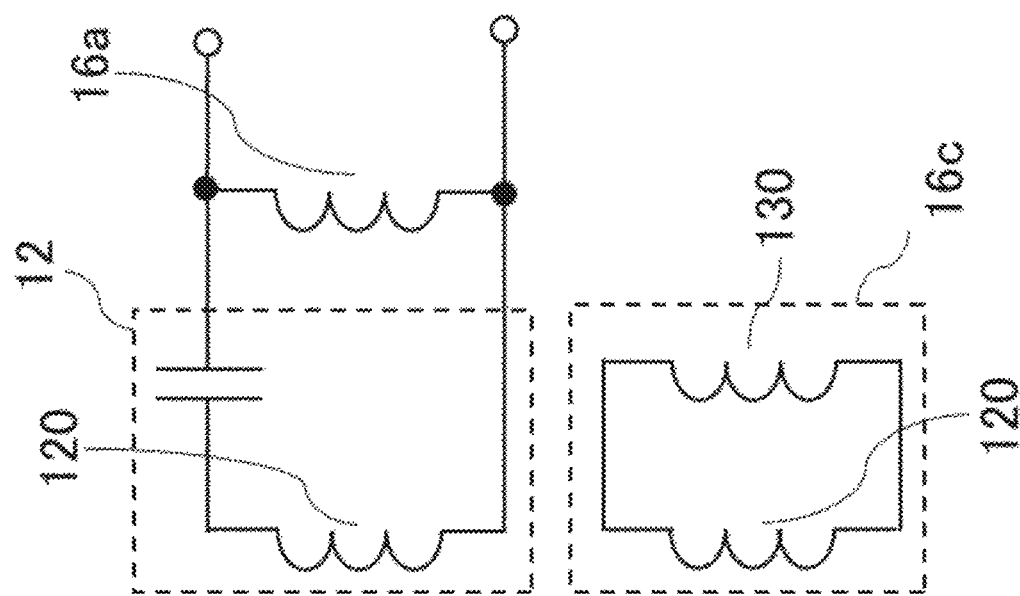
FIG. 12 is a schematic configuration diagram showing an example of a circuit configuration of the power receiving device according to Embodiment 3 of the present disclosure.

FIG. 12 is a schematic configuration diagram showing an example of a circuit configuration of the power receiving device according to Embodiment 3 of the present disclosure. As shown in FIG. 12, when the inductance of the power transmitting coil 110 is expected to be increased by the influence of the power receiving coil 120, the compensation element 16c can be made an inductive reactance component by connecting the reactance 130 in configuration of the power receiving device 300.

Figure 13:
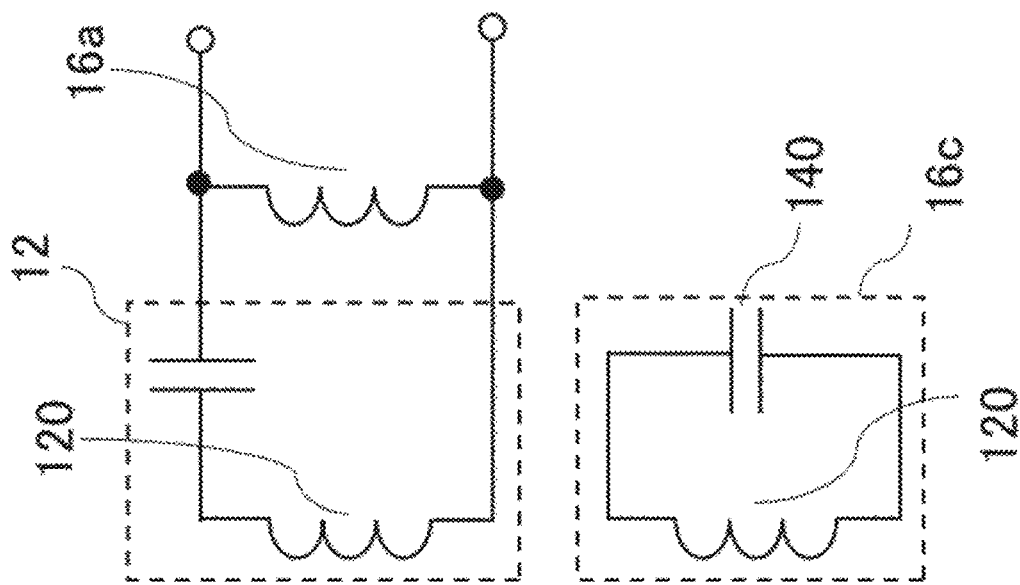
FIG. 13 is a schematic configuration diagram showing another example of the circuit configuration of the power receiving device according to Embodiment 3 of the present disclosure.

FIG. 13 is a schematic configuration diagram showing another example of the circuit configuration of the power receiving device according to Embodiment 3 of the present disclosure. As shown in FIG. 13, when the inductance of the power transmitting coil 110 is expected to be decreased by the influence of the power receiving coil 120, the second compensation element 16c can be made a capacitive reactance component by connecting the capacitor 140.

Figure 14:
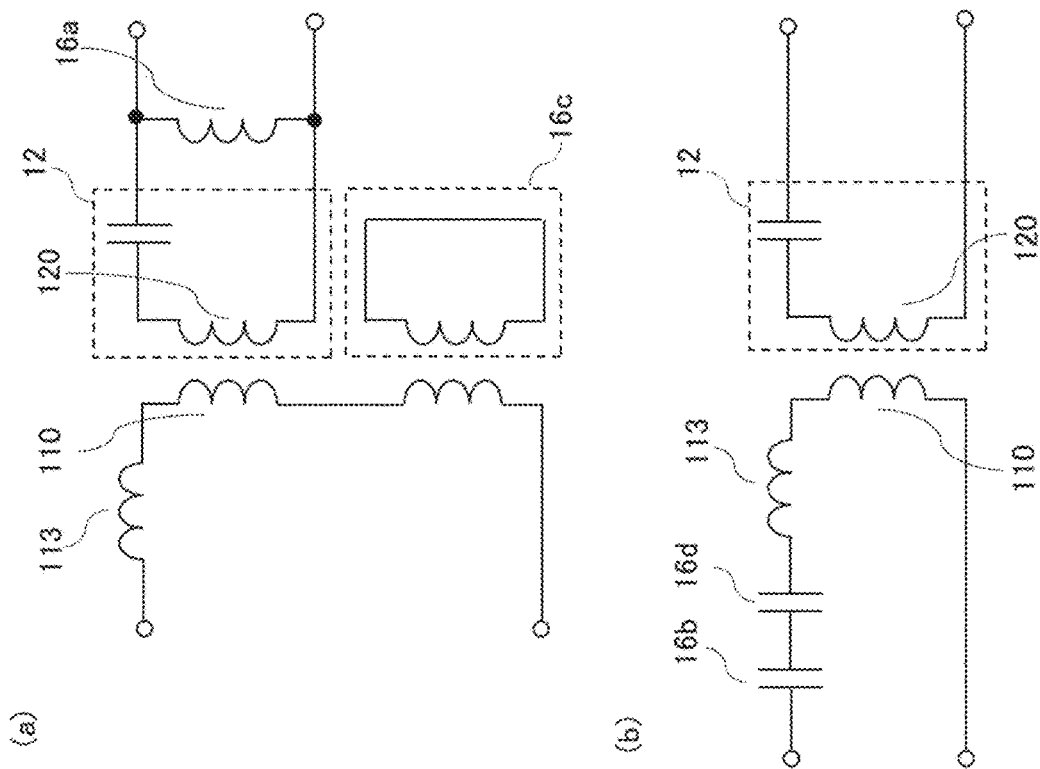
FIG. 14 is a schematic configuration diagram showing an equivalent circuit of a resonant circuit portion including a compensation element of the power receiving device according to Embodiment 3 of the present disclosure.

FIG. 14 is a schematic configuration diagram showing an equivalent circuit of a resonant circuit portion including a compensation element of the power receiving device according to Embodiment 3 of the present disclosure. As shown in FIG. 14(a), the power receiving circuit according to Embodiment 3 has a configuration in which both the first compensation element 16a and the second compensation element 16c are connected. FIG. 14(b) shows an equivalent circuit in which the first compensation element 16a and the second compensation element 16c are represented as reactance components on the side of the power-transmitting resonant circuit 11, wherein a first capacitive reactance 16b and a second capacitive reactance 16d are shown connected in series to the power transmitting coil 110. The first capacitive reactance 16b and the second capacitive reactance 16d have effects that lower the inductance of the power transmitting coil 110. Thus, the effect the same as that in Embodiment 1 can be obtained by designing the compensation element 16a and the compensation element 16c such that the combined impedance of the first capacitive reactance 16b and the second capacitive reactance 16d cancel out the increased inductor 113.

In addition, by being provided with the first compensation element 16a and the second compensation element 16c, the power receiving device 300 according to Embodiment 3 can split the compensation current path into two paths so that the compensation currents flow into the two compensation elements. The loss due to the resistance generated by the current is calculated based on the square of the current value. Therefore, diverting the current into the two paths reduces the maximum values of the currents, resulting in reducing the losses associated with the compensation currents.

The present disclosure allows, within its scope, any combination, modification, or omission the contents of the embodiments as appropriate.

DESCRIPTION OF SYMBOLS

1 . . . wireless power transfer system
10 . . . power transmitting source
11 . . . power-transmitting resonant circuit
12 . . . power-receiving resonant circuit
13 . . . rectifier circuit
14 . . . filter
15 . . . load
110 . . . power transmitting coil
120 . . . power receiving coil
121 . . . power-receiving-side resonant capacitor
16a, 16c . . . compensation element
100, 200, 300 . . . power receiving device

The invention claimed is:

1. A power receiving device for a wireless power transfer system, the power receiving device to which electric power is transmitted from a power transmitting device that includes a power transmitting source to generate a high frequency voltage and a power-transmitting resonant circuit with a power transmitting coil to generate an AC magnetic flux by resonance when receiving the high frequency voltage, the power receiving device comprising:

a power-receiving resonant circuit to receive the AC magnetic flux transmitted from the power-transmitting resonant circuit and convert the AC magnetic flux into AC power;

a rectifier circuit to convert the AC power outputted from the power-receiving resonant circuit into DC power;

a filter to attenuate a high frequency component included in the output from the rectifier circuit; and at least one compensation element provided to cancel out a variation of an inductance of the power transmitting coil, the variation attributable to movement of the power-receiving resonant circuit to a position where electric power can be received, wherein the at least one compensation element includes an inductive reactance element connected in parallel between the power-receiving resonant circuit and the rectifier circuit, and an inductive reactance element magnetically coupled with the power transmitting coil.

2. A power receiving device for a wireless power transfer system, the power receiving device to which electric power is transmitted from a power transmitting device that includes a power transmitting source to generate a high frequency voltage and a power-transmitting resonant circuit with a power transmitting coil to generate an AC magnetic flux by resonance when receiving the high frequency voltage, the power receiving device comprising:

a power-receiving resonant circuit to receive the AC magnetic flux transmitted from the power-transmitting resonant circuit and convert the AC magnetic flux into AC power;

a rectifier circuit to convert the AC power outputted from the power-receiving resonant circuit into DC power;

a filter to attenuate a high frequency component included in the output from the rectifier circuit; and at least one compensation element provided to cancel out a variation of an inductance of the power transmitting coil, the variation attributable to movement of the power-receiving resonant circuit to a position where electric power can be received, wherein the at least one compensation element includes a first compensation element that is a reactance element connected in parallel between the power-receiving resonant circuit and the rectifier circuit, and a second compensation element that is a reactor magnetically coupled with the power transmitting coil.

3. The power receiving device according to claim 2, wherein a different reactance element is connected to the second compensation element that is the reactor magnetically coupled with the power transmitting coil.

4. A wireless power transfer system comprising a power transmitting device and a plurality of power receiving devices, the power transmitting device comprising:
a power transmitting source to generate a high frequency voltage; and
a power-transmitting resonant circuit with a power transmitting coil to generate an AC magnetic flux by resonance when receiving the high frequency voltage, the power receiving devices each comprising:
a power-receiving resonant circuit to receive the AC magnetic flux transmitted from the power-transmitting resonant circuit and convert the AC magnetic flux into AC power;
a rectifier circuit to convert the AC power outputted from the power-receiving resonant circuit into DC power;
a filter to attenuate a high frequency component included in the output from the rectifier circuit; and
at least one compensation element provided to cancel out a variation of an inductance of the power transmitting coil, the variation attributable to movement of the power-receiving resonant circuit to a position where electric power can be received,
wherein the at least one compensation element includes an inductive reactance element connected in parallel between the power-receiving resonant circuit and the rectifier circuit, and an inductive reactance element magnetically coupled with the power transmitting coil.

5. The wireless power transfer system according to claim 4, wherein the power-transmitting resonant circuit comprises at least one power-transmitting-side resonant capacitor, and a capacity of the at least one power-transmitting-side resonant capacitor is constant regardless of the number of the power receiving devices present at positions to receive electric power.

6. The wireless power transfer system according to claim 4, wherein a path of a resonant current flowing in the power-transmitting resonant circuit is the same while the system is operating.

* * * * *